United States Patent
Pintat et al.

(10) Patent No.: US 10,711,627 B2
(45) Date of Patent: Jul. 14, 2020

(54) OPTIMIZED AERODYNAMIC PROFILE FOR AN ARM OF A STRUCTURAL CASING OF A TURBINE, AND STRUCTURAL CASING HAVING SUCH AN ARM

(71) Applicant: Safran Aircraft Engines, Paris (FR)

(72) Inventors: Ludovic Pintat, Cesson (FR); Pierre Ginibre, Melun (FR); Vincent Nicolas Leonardon, Paris (FR); Pierre Hervé Fernand Marche, Saint Serotin (FR); Thomas Michel Julien Mervant, Paris (FR)

(73) Assignee: Safran Aircraft Engines, Paris (FR)

( * ) Notice: Subject to any disclaimer, the term of this patent is extended or adjusted under 35 U.S.C. 154(b) by 138 days.

(21) Appl. No.: 15/976,013

(22) Filed: May 10, 2018

(65) Prior Publication Data

US 2018/0328199 A1    Nov. 15, 2018

Related U.S. Application Data

(60) Provisional application No. 62/504,567, filed on May 11, 2017.

(51) Int. Cl.
*F01D 9/04* (2006.01)
*F01D 25/16* (2006.01)

(52) U.S. Cl.
CPC .......... *F01D 9/041* (2013.01); *F01D 25/162* (2013.01); *F05D 2250/74* (2013.01)

(58) Field of Classification Search
CPC ........ F01D 9/041; F01D 5/141; F01D 25/162; F01D 25/30; F05D 2220/323; F05D 2240/128; F05D 2250/74
See application file for complete search history.

(56) References Cited

U.S. PATENT DOCUMENTS

2007/0068136 A1    3/2007    Cameriano et al.

*Primary Examiner* — Richard A Edgar
(74) *Attorney, Agent, or Firm* — Bookoff McAndrews, PLLC

(57) ABSTRACT

When cold and in the non-coated state, the aerodynamic profile is substantially identical to a nominal profile determined by the Cartesian coordinates X,Y, Zadim given in Table 1, in which the coordinate Zadim is the quotient D/H where D is the distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

15 Claims, 2 Drawing Sheets

OPTIMIZED AERODYNAMIC PROFILE FOR AN ARM OF A STRUCTURAL CASING OF A TURBINE, AND STRUCTURAL CASING HAVING SUCH AN ARM

CROSS-REFERENCE TO RELATED APPLICATION

This application claims the benefit of priority to U.S. Patent Application No. 62/504,567, filed on May 11, 2017, the entirety of which is incorporated by reference herein.

INTRODUCTION

The present disclosure relates to an aerodynamic profile for an arm of a structural casing of a turbine.

In particular, the disclosure relates to the aerodynamic profile of an arm connecting a central hub and a shroud of such casing.

The disclosure relates in particular to the aerodynamic profile of an arm belonging to a series of arms connecting the central hub and the shroud.

More particularly, the turbine is a low pressure turbine of the type used in a turbojet of an aircraft.

In particular, the structural casing is an exhaust casing of the turbine.

The exhaust casing may be of the type disclosed in the published US patent application No. 2007068136, the contents of which is herein incorporated.

An arm of a structural casing of a turbine is subject to a series of constraints. In particular, the aerodynamic profile of such an arm participates to the global efficiency of the turbine and, as such, it should enable the turbine to provide the desired efficiency. In order to do that it must be such that the flow of air around the profile is sound, i.e. substantially such that it does not give rise to turbulence, which is harmful for overall efficiency.

It must be capable of being installed properly in the environment of the turbine.

Furthermore, the arm must present a profile enabling it to be manufactured in a reliable and cost-effective manner by available manufacturing methods, such as casting, forging, machining, additive fabrication, or else weaving, without this list being limitative.

Furthermore, the profile of the arm must enable it to withstand the mechanical stresses to which the arm is subjected, by enabling those stresses to be spread over the entire arm in such a manner as to avoid premature wear thereof, both in static and in dynamic modes.

In particular, the arm being a connection arm between a central hub and a shroud of the turbine, it shall be capable of efficiently contributing to ensure proper mechanical connection between the central hub and the shroud, and of being fastened easily to the central hub and to the shroud of the casing. Also, in such case, the arm contributes to the proper centering and positioning of the shroud with respect to the central hub.

In addition, in such case, the arm contributes to redressing the flow coming from the primary thrust nozzle of the turbine engine. Optionally, the arm may serve as a casing for one or more ducts.

An object of the disclosure is to propose an aerodynamic profile for an arm of a structural casing of a turbine having a central hub and a shroud, said profile being optimized, and capable of satisfying those objectives.

This object is achieved by the fact that when cold and in a non-coated state, said profile is substantially identical to a nominal profile determined by the Cartesian coordinates X,Y,Zadim given in Table 1, in which the coordinate Zadim is the quotient D/H where D is the distance of the point under consideration from a first reference X,Y plane situated at the base of the nominal profile, and H is the height of said profile measured from said first reference plane that is the intersection of the stacking axis of the arm and the axisymmetric surface of the hub, out to a second reference plane that is the intersection of said stacking axis with the axisymmetric inner surface of the shroud casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the disclosure is defined in the non-coated state. Since arms of turbine casings are subjected to high temperature gradients, it is common practice for them to be provided with a coating having thermal properties enabling them more easily to withstand such temperature variations. The profile is determined prior to installing such a coating.

It is stated above that the profile of the disclosure is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

It is also preferable for the X,Y coordinates of the aerodynamic profile to lie within a range of ±5% relative to the X,Y coordinates of the nominal profile.

The aerodynamic profile may be positioned rotated within ±10°, particularly within ±5°, more particularly within ±3°, with respect to the stacking axis. These variations take account in particular of at least one of manufacturing tolerances of the profile, the setting of the profile to adapt to the flow coming from the turbine sections situated upstream, and possible deformation occurring when mounting the arm and integrating the same in the turbine.

BRIEF DESCRIPTION OF THE DRAWINGS

The disclosure can be better understood and its advantages appear better on reading the following detailed description of an embodiment given by way of non-limiting example. The description refers to the accompanying drawings, in which.

DETAILED DESCRIPTION

Figure 1:
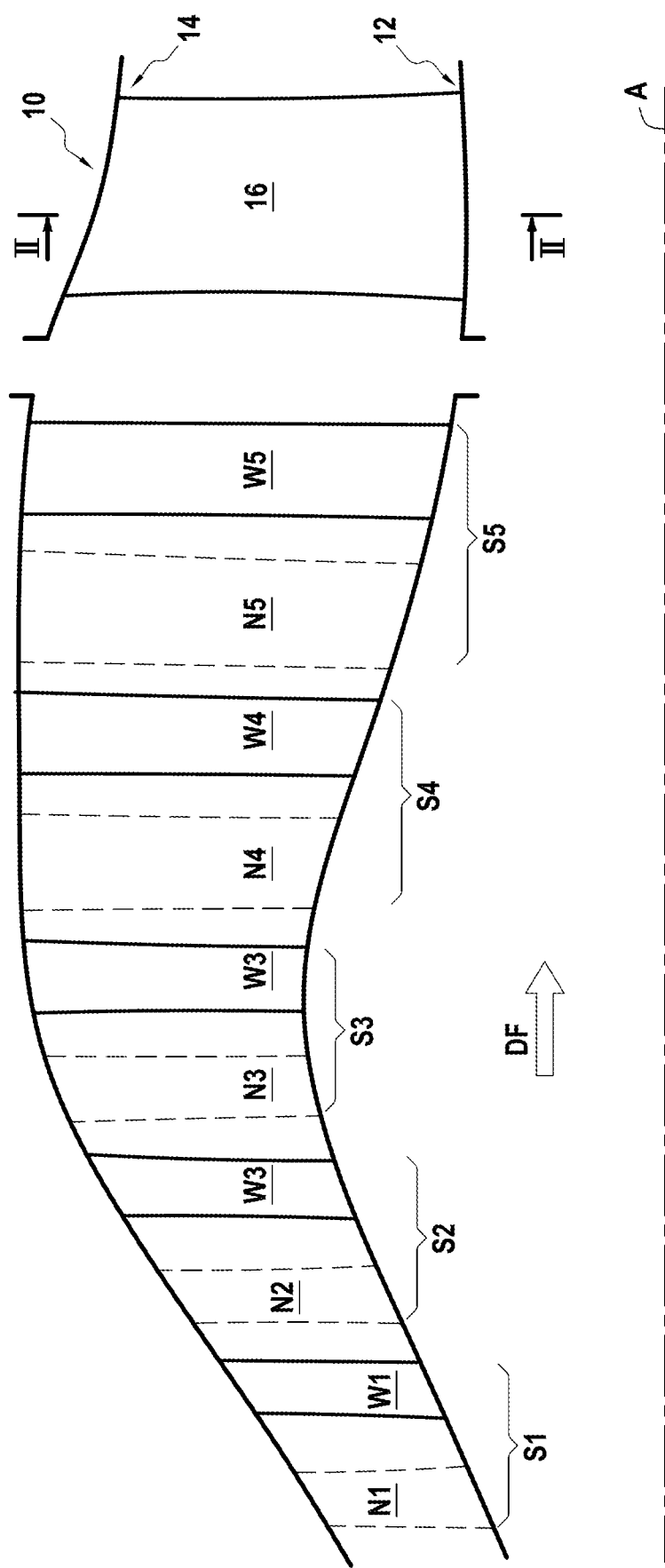
FIG. 1 is a fragmentary axial section view of a turbine including an exhaust casing having an arm of profile that corresponds to that of the disclosure.

The turbine shown in axial section in FIG. 1 comprises five stages referenced respectively S1 to S5. In the direction DF going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages S1 to S7 are given references N1 to N5, whereas the blades of rotary wheels of stages S1 to S5 are given respective references W1 to W5.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine, the disks of the respective wheels being constrained to rotate together. In the example shown, the tips of the blades of the rotary wheels, formed at their radially-outer ends, carry top platforms.

As shown in FIG. 1, the turbine further comprises an exhaust casing 10 comprising a central hub 12, a shroud 14 and a plurality of arms 16 connecting the hub 12 and the shroud 14. The central hub, the shroud and the external ring are arranged concentrically.

As mentioned, the exhaust casing may be of the type disclosed by the published US patent application No. 2007068136. The arms 16 serve to connect the central hub 12 to the shroud 14. In a known manner, the central hub serves as a bearing support, for bearings supporting rotary parts of the turbine, especially a rotating shaft (not shown) to which the rotary disks are mounted.

Figure 2:
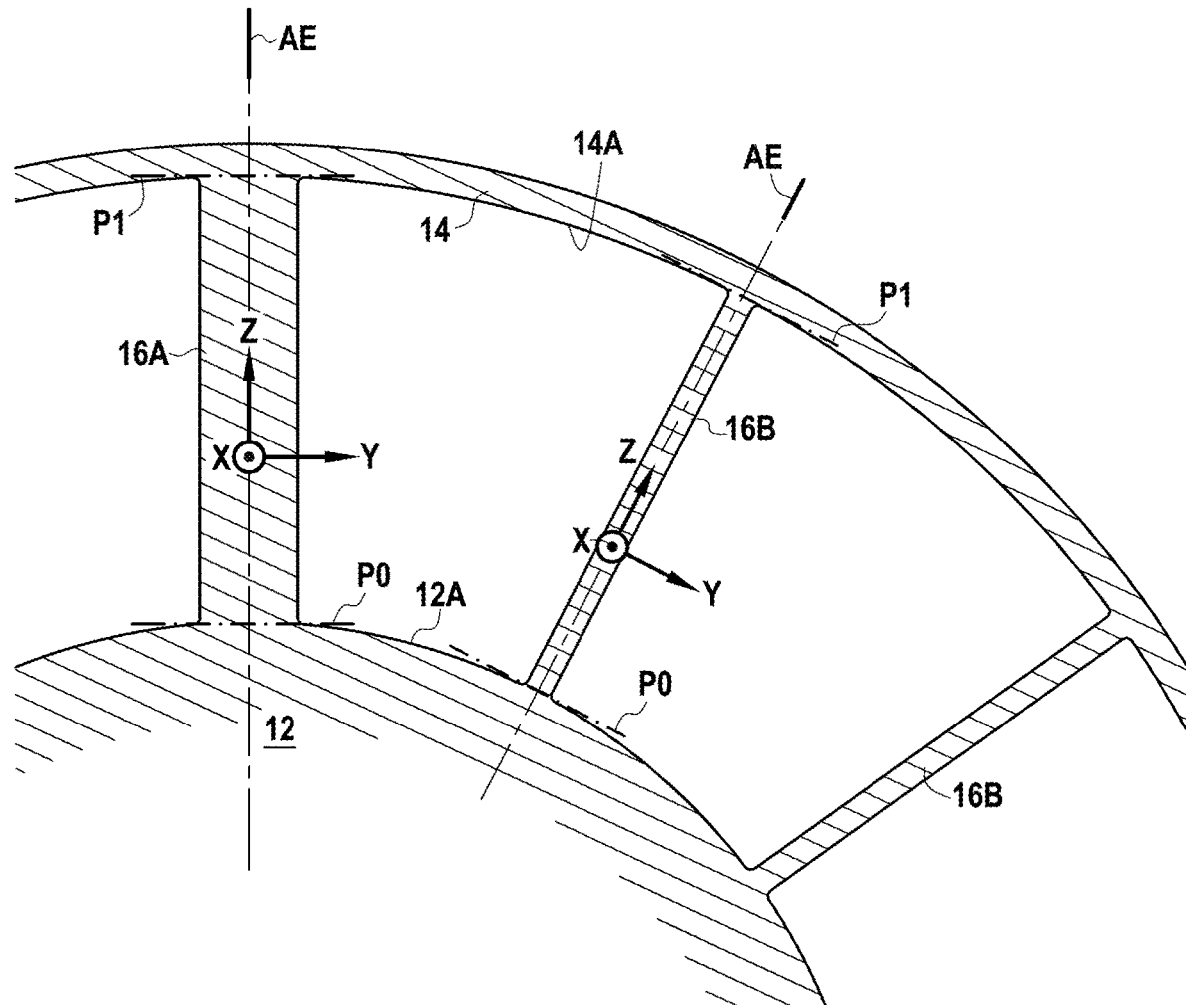
FIG. 2 is a partial view of the exhaust casing taken on line II-II of FIG. 1.

As best seen in FIG. 2, and as mentioned in US 2007068136, the arms 16 comprise two categories of arms, namely at least one main arm 16A and at least one secondary arm 16B. The casing may comprise a total of 10 to 20 arms, including between 1 and 3 main arms and between 7 and 19 secondary arms. In particular, the casing may comprise 15 arms including 1 main arm and 14 secondary arms.

Seen in the circumferential direction, the main arms are thicker than the secondary arms. In particular, the main arm may serve as casings for one or more ducts.

The arms 16A and 16B are each attached to the central hub 12 are their radially inner ends, and are each attached the shroud 14 at their radially outer ends. The arms and at least part of the central hub and/or the shroud may be integrally formed. The arms may be formed integrally with one or both of the central hub and the shroud. The arms may be distinct from at least one of the elements comprising the central hub and the shroud and be welded or affixed in any suitable manner to said at least one element.

By convention, the aerodynamic profile of the arm is the entire portion of said arm that extends radially from the external cylindrical surface of the central hub to the internal cylindrical surface of the shroud.

The disclosure relates in particular to a main arm 16A connecting the central hub and the shroud.

In FIG. 2, there can be seen a frame of reference comprising Cartesian coordinates X,Y,Z for each one of the arms 16A and 16B. The radial direction Z is the height direction of the arm, which extends radially from its root platform to its top platform. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the disclosure is determined is defined in following Table 1 of coordinates, in which the coordinate Zadim, measured along the axis Z is non-dimensional, whereas the dimensions X and Y, respectively measured along the axes X and Y, are expressed in millimeters.

TABLE 1

| X | Y | Zadim |
|---|---|---|
| −56.9443 | −37.9659 | −0.2 |
| −57.0582 | −38.1951 | −0.2 |
| −57.2146 | −38.5325 | −0.2 |
| −57.4342 | −39.0628 | −0.2 |
| −57.6945 | −39.819 | −0.2 |
| −57.9503 | −40.8317 | −0.2 |
| −58.1314 | −42.1229 | −0.2 |
| −58.1465 | −43.6967 | −0.2 |
| −57.8916 | −45.5294 | −0.2 |
| −57.2688 | −47.5662 | −0.2 |
| −56.2035 | −49.7266 | −0.2 |
| −54.6546 | −51.9183 | −0.2 |
| −52.6151 | −54.0525 | −0.2 |
| −50.1031 | −56.052 | −0.2 |
| −47.1559 | −57.8583 | −0.2 |
| −43.8212 | −59.4339 | −0.2 |
| −40.1503 | −60.7594 | −0.2 |
| −36.1932 | −61.8276 | −0.2 |
| −31.9973 | −62.6407 | −0.2 |
| −27.6067 | −63.208 | −0.2 |
| −23.0622 | −63.5437 | −0.2 |
| −18.4015 | −63.6648 | −0.2 |
| −13.6598 | −63.5899 | −0.2 |
| −8.86993 | −63.3396 | −0.2 |
| −4.06279 | −62.9364 | −0.2 |
| 0.732695 | −62.4028 | −0.2 |
| 5.489262 | −61.7619 | −0.2 |
| 10.18082 | −61.0343 | −0.2 |
| 14.78236 | −60.2386 | −0.2 |
| 19.27067 | −59.396 | −0.2 |
| 23.62381 | −58.5257 | −0.2 |
| 27.82082 | −57.6445 | −0.2 |
| 31.84173 | −56.7657 | −0.2 |
| 35.66856 | −55.9038 | −0.2 |
| 39.28484 | −55.0713 | −0.2 |
| 42.67563 | −54.2779 | −0.2 |
| 45.82774 | −53.5312 | −0.2 |
| 48.73037 | −52.8382 | −0.2 |
| 51.37497 | −52.2038 | −0.2 |
| 53.75552 | −51.6316 | −0.2 |
| 55.86881 | −51.1234 | −0.2 |
| 57.71469 | −50.6798 | −0.2 |
| 59.29612 | −50.2995 | −0.2 |
| 60.52248 | −49.7081 | −0.2 |
| 61.24685 | −48.8704 | −0.2 |
| 61.60194 | −48.0781 | −0.2 |
| 61.72882 | −47.4421 | −0.2 |
| 61.74472 | −46.9897 | −0.2 |
| 61.72303 | −46.7048 | −0.2 |
| 61.69125 | −46.4877 | −0.2 |
| 61.65026 | −46.2961 | −0.2 |
| 61.58147 | −46.0503 | −0.2 |
| 61.43405 | −45.6737 | −0.2 |
| 61.14592 | −45.171 | −0.2 |
| 60.63181 | −44.5901 | −0.2 |
| 59.80325 | −44.0495 | −0.2 |
| 58.61449 | −43.7918 | −0.2 |
| 57.16377 | −43.875 | −0.2 |
| 55.471 | −43.9803 | −0.2 |
| 53.5327 | −44.0971 | −0.2 |
| 51.349 | −44.223 | −0.2 |
| 48.92288 | −44.3543 | −0.2 |
| 46.26007 | −44.486 | −0.2 |
| 43.36884 | −44.6123 | −0.2 |
| 40.25983 | −44.7265 | −0.2 |
| 36.94589 | −44.82 | −0.2 |
| 33.44197 | −44.8825 | −0.2 |
| 29.76502 | −44.9054 | −0.2 |
| 25.93379 | −44.8792 | −0.2 |
| 21.96874 | −44.7926 | −0.2 |
| 17.8919 | −44.6357 | −0.2 |
| 13.72651 | −44.4016 | −0.2 |
| 9.496988 | −44.0832 | −0.2 |

TABLE 1-continued

| X | Y | Zadim |
|---|---|---|
| 5.228591 | −43.6751 | −0.2 |
| 0.946998 | −43.1753 | −0.2 |
| −3.32205 | −42.5846 | −0.2 |
| −7.55301 | −41.9061 | −0.2 |
| −11.721 | −41.146 | −0.2 |
| −15.8022 | −40.3137 | −0.2 |
| −19.7743 | −39.4213 | −0.2 |
| −23.6167 | −38.4836 | −0.2 |
| −27.3109 | −37.5184 | −0.2 |
| −30.8412 | −36.546 | −0.2 |
| −34.1957 | −35.5946 | −0.2 |
| −37.3647 | −34.6922 | −0.2 |
| −40.3438 | −33.8784 | −0.2 |
| −43.1318 | −33.2048 | −0.2 |
| −45.7264 | −32.7324 | −0.2 |
| −48.1166 | −32.5425 | −0.2 |
| −50.2632 | −32.6942 | −0.2 |
| −52.0973 | −33.201 | −0.2 |
| −53.5612 | −33.9688 | −0.2 |
| −54.663 | −34.8423 | −0.2 |
| −55.4621 | −35.6899 | −0.2 |
| −56.0279 | −36.4319 | −0.2 |
| −56.4196 | −37.0295 | −0.2 |
| −56.6794 | −37.4716 | −0.2 |
| −58.2807 | −31.7724 | −0.1 |
| −58.4027 | −31.9973 | −0.1 |
| −58.5712 | −32.3288 | −0.1 |
| −58.8098 | −32.8509 | −0.1 |
| −59.0973 | −33.5972 | −0.1 |
| −59.3895 | −34.5999 | −0.1 |
| −59.6171 | −35.8838 | −0.1 |
| −59.6891 | −37.456 | −0.1 |
| −59.5005 | −39.2967 | −0.1 |
| −58.9517 | −41.3547 | −0.1 |
| −57.9651 | −43.5521 | −0.1 |
| −56.4964 | −45.7984 | −0.1 |
| −54.5353 | −48.0049 | −0.1 |
| −52.0972 | −50.0937 | −0.1 |
| −49.2172 | −52.0054 | −0.1 |
| −45.9415 | −53.7004 | −0.1 |
| −42.3209 | −55.1576 | −0.1 |
| −38.405 | −56.368 | −0.1 |
| −34.2412 | −57.3322 | −0.1 |
| −29.8739 | −58.0577 | −0.1 |
| −25.3445 | −58.5573 | −0.1 |
| −20.6912 | −58.8467 | −0.1 |
| −15.9499 | −58.9431 | −0.1 |
| −11.1541 | −58.866 | −0.1 |
| −6.33558 | −58.6366 | −0.1 |
| −1.52395 | −58.2766 | −0.1 |
| 3.25266 | −57.808 | −0.1 |
| 7.967434 | −57.2503 | −0.1 |
| 12.59471 | −56.6214 | −0.1 |
| 17.11054 | −55.9414 | −0.1 |
| 21.49226 | −55.2289 | −0.1 |
| 25.71837 | −54.4999 | −0.1 |
| 29.76839 | −53.7669 | −0.1 |
| 33.62386 | −53.0438 | −0.1 |
| 37.26786 | −52.3424 | −0.1 |
| 40.68509 | −51.672 | −0.1 |
| 43.86211 | −51.0397 | −0.1 |
| 46.78788 | −50.4519 | −0.1 |
| 49.45366 | −49.9135 | −0.1 |
| 51.85333 | −49.4277 | −0.1 |
| 53.9836 | −48.9961 | −0.1 |
| 55.84429 | −48.6195 | −0.1 |
| 57.43843 | −48.2966 | −0.1 |
| 58.68535 | −47.7498 | −0.1 |
| 59.43951 | −46.9389 | −0.1 |
| 59.82299 | −46.1599 | −0.1 |
| 59.97277 | −45.5289 | −0.1 |
| 60.00499 | −45.0773 | −0.1 |
| 59.9936 | −44.7919 | −0.1 |
| 59.96968 | −44.5738 | −0.1 |
| 59.93565 | −44.3808 | −0.1 |
| 59.87577 | −44.1327 | −0.1 |
| 59.74205 | −43.751 | −0.1 |
| 59.47226 | −43.2383 | −0.1 |
| 58.97948 | −42.6392 | −0.1 |
| 58.17098 | −42.069 | −0.1 |
| 56.99231 | −41.7685 | −0.1 |
| 55.53953 | −41.7993 | −0.1 |
| 53.84407 | −41.8433 | −0.1 |
| 51.90281 | −41.89 | −0.1 |
| 49.71598 | −41.937 | −0.1 |
| 47.28671 | −41.9806 | −0.1 |
| 44.62088 | −42.0159 | −0.1 |
| 41.72697 | −42.0378 | −0.1 |
| 38.61587 | −42.0396 | −0.1 |
| 35.30072 | −42.0133 | −0.1 |
| 31.79682 | −41.9493 | −0.1 |
| 28.12144 | −41.8394 | −0.1 |
| 24.29366 | −41.6747 | −0.1 |
| 20.33433 | −41.4449 | −0.1 |
| 16.26581 | −41.1409 | −0.1 |
| 12.11159 | −40.7565 | −0.1 |
| 7.896335 | −40.2855 | −0.1 |
| 3.645463 | −39.7236 | −0.1 |
| −0.61528 | −39.0694 | −0.1 |
| −4.86021 | −38.3249 | −0.1 |
| −9.0639 | −37.4941 | −0.1 |
| −13.2017 | −36.5839 | −0.1 |
| −17.2502 | −35.6047 | −0.1 |
| −21.1874 | −34.5694 | −0.1 |
| −24.9934 | −33.4935 | −0.1 |
| −28.6504 | −32.3955 | −0.1 |
| −32.1433 | −31.2962 | −0.1 |
| −35.4612 | −30.2243 | −0.1 |
| −38.5956 | −29.208 | −0.1 |
| −41.5433 | −28.2871 | −0.1 |
| −44.3052 | −27.5133 | −0.1 |
| −46.8811 | −26.9474 | −0.1 |
| −49.2628 | −26.6713 | −0.1 |
| −51.4135 | −26.7454 | −0.1 |
| −53.2646 | −27.1856 | −0.1 |
| −54.7554 | −27.9001 | −0.1 |
| −55.888 | −28.7332 | −0.1 |
| −56.7172 | −29.5514 | −0.1 |
| −57.3095 | −30.2725 | −0.1 |
| −57.7224 | −30.8555 | −0.1 |
| −57.9981 | −31.288 | −0.1 |
| −58.3262 | −27.5689 | 0 |
| −58.4486 | −27.7936 | 0 |
| −58.6176 | −28.1248 | 0 |
| −58.857 | −28.6466 | 0 |
| −59.1457 | −29.3924 | 0 |
| −59.4395 | −30.3947 | 0 |
| −59.6691 | −31.6782 | 0 |
| −59.7435 | −33.2503 | 0 |
| −59.5578 | −35.0913 | 0 |
| −59.0123 | −37.1501 | 0 |
| −58.0292 | −39.3491 | 0 |
| −56.564 | −41.5977 | 0 |
| −54.6063 | −43.8072 | 0 |
| −52.1715 | −45.8999 | 0 |
| −49.2945 | −47.8161 | 0 |
| −46.0215 | −49.5163 | 0 |
| −42.4032 | −50.9792 | 0 |
| −38.4892 | −52.1957 | 0 |
| −34.3269 | −53.1664 | 0 |
| −29.9608 | −53.8988 | 0 |
| −25.4321 | −54.4055 | 0 |
| −20.7793 | −54.7022 | 0 |
| −16.0381 | −54.806 | 0 |
| −11.2423 | −54.7365 | 0 |
| −6.42337 | −54.5147 | 0 |
| −1.61118 | −54.1623 | 0 |
| 3.166159 | −53.7011 | 0 |
| 7.881804 | −53.1508 | 0 |
| 12.51007 | −52.5292 | 0 |
| 17.02695 | −51.8563 | 0 |
| 21.40979 | −51.1507 | 0 |
| 25.63704 | −50.4283 | 0 |
| 29.68821 | −49.7017 | 0 |
| 33.54481 | −48.9846 | 0 |
| 37.1899 | −48.289 | 0 |

TABLE 1-continued

| X | Y | Zadim |
|---|---|---|
| 40.60818 | −47.624 | 0 |
| 43.7862 | −46.9966 | 0 |
| 46.71288 | −46.4135 | 0 |
| 49.3795 | −45.8792 | 0 |
| 51.77993 | −45.3972 | 0 |
| 53.91088 | −44.969 | 0 |
| 55.77216 | −44.5952 | 0 |
| 57.36681 | −44.2748 | 0 |
| 58.61458 | −43.73 | 0 |
| 59.37 | −42.9203 | 0 |
| 59.75472 | −42.1419 | 0 |
| 59.90548 | −41.5112 | 0 |
| 59.93842 | −41.0596 | 0 |
| 59.92747 | −40.7742 | 0 |
| 59.90389 | −40.5561 | 0 |
| 59.87016 | −40.363 | 0 |
| 59.81067 | −40.1148 | 0 |
| 59.67756 | −39.7329 | 0 |
| 59.40857 | −39.2197 | 0 |
| 58.91674 | −38.6199 | 0 |
| 58.10913 | −38.0484 | 0 |
| 56.93093 | −37.746 | 0 |
| 55.4781 | −37.7745 | 0 |
| 53.78258 | −37.8159 | 0 |
| 51.84125 | −37.8596 | 0 |
| 49.65435 | −37.9031 | 0 |
| 47.22501 | −37.9429 | 0 |
| 44.55913 | −37.9741 | 0 |
| 41.66519 | −37.9913 | 0 |
| 38.55408 | −37.9883 | 0 |
| 35.23898 | −37.9568 | 0 |
| 31.73519 | −37.8873 | 0 |
| 28.05998 | −37.7716 | 0 |
| 24.23247 | −37.6009 | 0 |
| 20.2735 | −37.3649 | 0 |
| 16.20547 | −37.0545 | 0 |
| 12.05186 | −36.6636 | 0 |
| 7.837349 | −36.186 | 0 |
| 3.587366 | −35.6173 | 0 |
| −0.67235 | −34.9565 | 0 |
| −4.9161 | −34.2053 | 0 |
| −9.11847 | −33.3679 | 0 |
| −13.2548 | −32.4512 | 0 |
| −17.3018 | −31.4657 | 0 |
| −21.2374 | −30.4241 | 0 |
| −25.0417 | −29.3423 | 0 |
| −28.697 | −28.2385 | 0 |
| −32.1881 | −27.1338 | 0 |
| −35.5043 | −26.0567 | 0 |
| −38.6371 | −25.0355 | 0 |
| −41.5834 | −24.1099 | 0 |
| −44.344 | −23.3317 | 0 |
| −46.919 | −22.7619 | 0 |
| −49.3003 | −22.482 | 0 |
| −51.4511 | −22.5527 | 0 |
| −53.303 | −22.99 | 0 |
| −54.7948 | −23.7022 | 0 |
| −55.9288 | −24.5335 | 0 |
| −56.7592 | −25.3504 | 0 |
| −57.3526 | −26.0705 | 0 |
| −57.7665 | −26.6529 | 0 |
| −58.0429 | −27.0849 | 0 |
| −58.073 | −24.0664 | 0.1 |
| −58.1931 | −24.2924 | 0.1 |
| −58.3587 | −24.6254 | 0.1 |
| −58.5926 | −25.1496 | 0.1 |
| −58.8734 | −25.8984 | 0.1 |
| −59.1567 | −26.9037 | 0.1 |
| −59.3728 | −28.1896 | 0.1 |
| −59.4308 | −29.7624 | 0.1 |
| −59.2259 | −31.6014 | 0.1 |
| −58.6588 | −33.6543 | 0.1 |
| −57.6527 | −35.8429 | 0.1 |
| −56.164 | −38.076 | 0.1 |
| −54.1833 | −40.2649 | 0.1 |
| −51.7268 | −42.332 | 0.1 |
| −48.8298 | −44.218 | 0.1 |
| −45.5392 | −45.8838 | 0.1 |

TABLE 1-continued

| X | Y | Zadim |
|---|---|---|
| −41.9058 | −47.3087 | 0.1 |
| −37.9792 | −48.4842 | 0.1 |
| −33.807 | −49.4112 | 0.1 |
| −29.4335 | −50.0979 | 0.1 |
| −24.8998 | −50.5571 | 0.1 |
| −20.2441 | −50.8051 | 0.1 |
| −15.5021 | −50.8593 | 0.1 |
| −10.7072 | −50.7395 | 0.1 |
| −5.89091 | −50.4673 | 0.1 |
| −1.08267 | −50.0644 | 0.1 |
| 3.689579 | −49.5533 | 0.1 |
| 8.399203 | −48.9536 | 0.1 |
| 13.0207 | −48.2836 | 0.1 |
| 17.53029 | −47.5634 | 0.1 |
| 21.9055 | −46.812 | 0.1 |
| 26.12495 | −46.0453 | 0.1 |
| 30.16829 | −45.2763 | 0.1 |
| 34.01717 | −44.519 | 0.1 |
| 37.65478 | −43.7852 | 0.1 |
| 41.06591 | −43.0844 | 0.1 |
| 44.23718 | −42.4238 | 0.1 |
| 47.1576 | −41.81 | 0.1 |
| 49.81849 | −41.2479 | 0.1 |
| 52.21373 | −40.7407 | 0.1 |
| 54.34008 | −40.2902 | 0.1 |
| 56.19734 | −39.897 | 0.1 |
| 57.78854 | −39.5599 | 0.1 |
| 59.03054 | −39.0021 | 0.1 |
| 59.77745 | −38.1845 | 0.1 |
| 60.154 | −37.4021 | 0.1 |
| 60.29814 | −36.7698 | 0.1 |
| 60.32634 | −36.318 | 0.1 |
| 60.31241 | −36.0326 | 0.1 |
| 60.28655 | −35.8148 | 0.1 |
| 60.2508 | −35.6221 | 0.1 |
| 60.18872 | −35.3746 | 0.1 |
| 60.05162 | −34.994 | 0.1 |
| 59.77726 | −34.4838 | 0.1 |
| 59.27917 | −33.8891 | 0.1 |
| 58.46563 | −33.3261 | 0.1 |
| 57.28433 | −33.0361 | 0.1 |
| 55.83187 | −33.0798 | 0.1 |
| 54.13688 | −33.1389 | 0.1 |
| 52.19611 | −33.2029 | 0.1 |
| 50.00978 | −33.2693 | 0.1 |
| 47.581 | −33.3346 | 0.1 |
| 44.91559 | −33.3937 | 0.1 |
| 42.02199 | −33.4412 | 0.1 |
| 38.91102 | −33.4708 | 0.1 |
| 35.59577 | −33.474 | 0.1 |
| 32.09145 | −33.4411 | 0.1 |
| 28.41523 | −33.3639 | 0.1 |
| 24.58614 | −33.2334 | 0.1 |
| 20.62492 | −33.0389 | 0.1 |
| 16.55385 | −32.771 | 0.1 |
| 12.39638 | −32.4236 | 0.1 |
| 8.177099 | −31.9902 | 0.1 |
| 3.921394 | −31.4661 | 0.1 |
| −0.34501 | −30.8499 | 0.1 |
| −4.59639 | −30.1432 | 0.1 |
| −8.80731 | −29.3498 | 0.1 |
| −12.953 | −28.4765 | 0.1 |
| −17.0101 | −27.5334 | 0.1 |
| −20.9564 | −26.5332 | 0.1 |
| −24.7718 | −25.4912 | 0.1 |
| −28.4385 | −24.4258 | 0.1 |
| −31.9409 | −23.3577 | 0.1 |
| −35.2683 | −22.3153 | 0.1 |
| −38.4116 | −21.327 | 0.1 |
| −41.3674 | −20.4323 | 0.1 |
| −44.136 | −19.6831 | 0.1 |
| −46.7169 | −19.1402 | 0.1 |
| −49.101 | −18.8853 | 0.1 |
| −51.2509 | −18.9786 | 0.1 |
| −53.0981 | −19.4352 | 0.1 |
| −54.5824 | −20.1629 | 0.1 |
| −55.7076 | −21.0061 | 0.1 |
| −56.5294 | −21.8316 | 0.1 |

TABLE 1-continued

| X | Y | Zadim |
|---|---|---|
| −57.1152 | −22.5579 | 0.1 |
| −57.523 | −23.1446 | 0.1 |
| −57.7948 | −23.5795 | 0.1 |
| −57.914 | −20.5217 | 0.2 |
| −58.0319 | −20.7489 | 0.2 |
| −58.1941 | −21.0835 | 0.2 |
| −58.4229 | −21.6099 | 0.2 |
| −58.6964 | −22.3614 | 0.2 |
| −58.9699 | −23.3695 | 0.2 |
| −59.1734 | −24.6574 | 0.2 |
| −59.216 | −26.2306 | 0.2 |
| −58.9931 | −28.0676 | 0.2 |
| −58.406 | −30.1149 | 0.2 |
| −57.3785 | −32.2935 | 0.2 |
| −55.8681 | −34.512 | 0.2 |
| −53.8661 | −36.6814 | 0.2 |
| −51.3895 | −38.7244 | 0.2 |
| −48.4743 | −40.5819 | 0.2 |
| −45.1675 | −42.2155 | 0.2 |
| −41.5203 | −43.6049 | 0.2 |
| −37.5825 | −44.7419 | 0.2 |
| −33.4014 | −45.6281 | 0.2 |
| −29.0214 | −46.272 | 0.2 |
| −24.4834 | −46.6869 | 0.2 |
| −19.8255 | −46.8894 | 0.2 |
| −15.0832 | −46.8972 | 0.2 |
| −10.2898 | −46.7306 | 0.2 |
| −5.47631 | −46.4113 | 0.2 |
| −0.67224 | −45.9615 | 0.2 |
| 4.094782 | −45.4037 | 0.2 |
| 8.798321 | −44.7581 | 0.2 |
| 13.41305 | −44.0429 | 0.2 |
| 17.91539 | −43.2786 | 0.2 |
| 22.28304 | −42.4845 | 0.2 |
| 26.4948 | −41.6767 | 0.2 |
| 30.53043 | −40.8682 | 0.2 |
| 34.37173 | −40.0732 | 0.2 |
| 38.00199 | −39.3039 | 0.2 |
| 41.4061 | −38.5698 | 0.2 |
| 44.57077 | −37.8783 | 0.2 |
| 47.48505 | −37.236 | 0.2 |
| 50.14031 | −36.6479 | 0.2 |
| 52.53049 | −36.1173 | 0.2 |
| 54.65233 | −35.6461 | 0.2 |
| 56.50566 | −35.2347 | 0.2 |
| 58.09349 | −34.8821 | 0.2 |
| 59.32998 | −34.3122 | 0.2 |
| 60.06886 | −33.4873 | 0.2 |
| 60.43774 | −32.7013 | 0.2 |
| 60.5757 | −32.0676 | 0.2 |
| 60.59948 | −31.6155 | 0.2 |
| 60.58276 | −31.3303 | 0.2 |
| 60.55478 | −31.1127 | 0.2 |
| 60.51714 | −30.9204 | 0.2 |
| 60.45264 | −30.6735 | 0.2 |
| 60.31183 | −30.2943 | 0.2 |
| 60.03251 | −29.7867 | 0.2 |
| 59.52863 | −29.1969 | 0.2 |
| 58.70961 | −28.6419 | 0.2 |
| 57.52554 | −28.3635 | 0.2 |
| 56.07358 | −28.4214 | 0.2 |
| 54.37924 | −28.4971 | 0.2 |
| 52.4392 | −28.58 | 0.2 |
| 50.25362 | −28.6678 | 0.2 |
| 47.82559 | −28.7568 | 0.2 |
| 45.16089 | −28.8419 | 0.2 |
| 42.26789 | −28.9178 | 0.2 |
| 39.15736 | −28.9777 | 0.2 |
| 35.8423 | −29.0133 | 0.2 |
| 32.33782 | −29.0147 | 0.2 |
| 28.66102 | −28.9735 | 0.2 |
| 24.83084 | −28.8803 | 0.2 |
| 20.86791 | −28.7246 | 0.2 |
| 16.79442 | −28.4965 | 0.2 |
| 12.63375 | −28.1898 | 0.2 |
| 8.410433 | −27.7976 | 0.2 |
| 4.149808 | −27.3151 | 0.2 |
| −0.12241 | −26.7406 | 0.2 |
| −4.3805 | −26.0755 | 0.2 |
| −8.59897 | −25.3233 | 0.2 |
| −12.753 | −24.4906 | 0.2 |
| −16.8191 | −23.5872 | 0.2 |
| −20.775 | −22.6256 | 0.2 |
| −24.6004 | −21.621 | 0.2 |
| −28.2773 | −20.5914 | 0.2 |
| −31.7901 | −19.5576 | 0.2 |
| −35.1274 | −18.5478 | 0.2 |
| −38.2802 | −17.5902 | 0.2 |
| −41.2446 | −16.7245 | 0.2 |
| −44.0205 | −16.0024 | 0.2 |
| −46.6065 | −15.4847 | 0.2 |
| −48.993 | −15.2532 | 0.2 |
| −51.1419 | −15.3674 | 0.2 |
| −52.9845 | −15.8421 | 0.2 |
| −54.4616 | −16.5843 | 0.2 |
| −55.5785 | −17.4384 | 0.2 |
| −56.3923 | −18.2719 | 0.2 |
| −56.971 | −19.0039 | 0.2 |
| −57.373 | −19.5946 | 0.2 |
| −57.6405 | −20.0321 | 0.2 |
| −57.8149 | −17.0271 | 0.3 |
| −57.9304 | −17.2554 | 0.3 |
| −58.0891 | −17.5917 | 0.3 |
| −58.3122 | −18.1206 | 0.3 |
| −58.5777 | −18.875 | 0.3 |
| −58.8404 | −19.8859 | 0.3 |
| −59.0302 | −21.1759 | 0.3 |
| −59.0561 | −22.7495 | 0.3 |
| −58.8137 | −24.584 | 0.3 |
| −58.2048 | −26.6249 | 0.3 |
| −57.1542 | −28.7925 | 0.3 |
| −55.6202 | −30.9947 | 0.3 |
| −53.5953 | −33.1427 | 0.3 |
| −51.097 | −35.1592 | 0.3 |
| −48.1622 | −36.9856 | 0.3 |
| −44.8382 | −38.5839 | 0.3 |
| −41.1764 | −39.9343 | 0.3 |
| −37.2267 | −41.0294 | 0.3 |
| −33.0365 | −41.8711 | 0.3 |
| −28.6498 | −42.4683 | 0.3 |
| −24.1077 | −42.8349 | 0.3 |
| −19.4479 | −42.9877 | 0.3 |
| −14.7058 | −42.945 | 0.3 |
| −9.91437 | −42.7274 | 0.3 |
| −5.1046 | −42.3569 | 0.3 |
| −0.30559 | −41.8559 | 0.3 |
| 4.455229 | −41.2475 | 0.3 |
| 9.151627 | −40.5518 | 0.3 |
| 13.75848 | −39.7875 | 0.3 |
| 18.25243 | −38.9754 | 0.3 |
| 22.61138 | −38.1348 | 0.3 |
| 26.8143 | −37.2822 | 0.3 |
| 30.84109 | −36.4307 | 0.3 |
| 34.6737 | −35.5949 | 0.3 |
| 38.29557 | −34.787 | 0.3 |
| 41.69168 | −34.0167 | 0.3 |
| 44.8488 | −33.2915 | 0.3 |
| 47.75608 | −32.6183 | 0.3 |
| 50.40493 | −32.0019 | 0.3 |
| 52.78933 | −31.4459 | 0.3 |
| 54.90603 | −30.9521 | 0.3 |
| 56.75488 | −30.5211 | 0.3 |
| 58.33886 | −30.1516 | 0.3 |
| 59.56922 | −29.5685 | 0.3 |
| 60.29927 | −28.7358 | 0.3 |
| 60.65976 | −27.9459 | 0.3 |
| 60.79097 | −27.3108 | 0.3 |
| 60.80994 | −26.8585 | 0.3 |
| 60.79018 | −26.5735 | 0.3 |
| 60.75988 | −26.3562 | 0.3 |
| 60.7202 | −26.1643 | 0.3 |
| 60.65308 | −25.918 | 0.3 |
| 60.50823 | −25.5404 | 0.3 |
| 60.22352 | −25.0358 | 0.3 |
| 59.71339 | −24.4514 | 0.3 |
| 58.88852 | −23.9052 | 0.3 |

TABLE 1-continued

| X | Y | Zadim |
|---|---|---|
| 57.70155 | −23.6394 | 0.3 |
| 56.25029 | −23.7127 | 0.3 |
| 54.55685 | −23.8064 | 0.3 |
| 52.6178 | −23.9101 | 0.3 |
| 50.43328 | −24.0211 | 0.3 |
| 48.00633 | −24.1359 | 0.3 |
| 45.34269 | −24.2494 | 0.3 |
| 42.45066 | −24.3561 | 0.3 |
| 39.34095 | −24.4491 | 0.3 |
| 36.02645 | −24.52 | 0.3 |
| 32.52218 | −24.5588 | 0.3 |
| 28.84516 | −24.5566 | 0.3 |
| 25.0142 | −24.5043 | 0.3 |
| 21.04984 | −24.3907 | 0.3 |
| 16.97415 | −24.206 | 0.3 |
| 12.81045 | −23.9436 | 0.3 |
| 8.583199 | −23.5964 | 0.3 |
| 4.317678 | −23.1593 | 0.3 |
| 0.039585 | −22.6304 | 0.3 |
| −4.22535 | −22.0106 | 0.3 |
| −8.45158 | −21.3034 | 0.3 |
| −12.6143 | −20.5149 | 0.3 |
| −16.6897 | −19.6548 | 0.3 |
| −20.6556 | −18.7354 | 0.3 |
| −24.4916 | −17.7716 | 0.3 |
| −28.1792 | −16.7812 | 0.3 |
| −31.7027 | −15.7849 | 0.3 |
| −35.0507 | −14.8106 | 0.3 |
| −38.2135 | −13.8867 | 0.3 |
| −41.1869 | −13.0526 | 0.3 |
| −43.9703 | −12.36 | 0.3 |
| −46.5617 | −11.87 | 0.3 |
| −48.9505 | −11.6638 | 0.3 |
| −51.0981 | −11.801 | 0.3 |
| −52.9355 | −12.2952 | 0.3 |
| −54.4047 | −13.0531 | 0.3 |
| −55.5124 | −13.919 | 0.3 |
| −56.3172 | −14.7612 | 0.3 |
| −56.8881 | −15.4993 | 0.3 |
| −57.2838 | −16.0942 | 0.3 |
| −57.5467 | −16.5345 | 0.3 |
| −57.9331 | −12.9372 | 0.4 |
| −58.0485 | −13.1656 | 0.4 |
| −58.2071 | −13.502 | 0.4 |
| −58.43 | −14.0309 | 0.4 |
| −58.6953 | −14.7854 | 0.4 |
| −58.9576 | −15.7964 | 0.4 |
| −59.147 | −17.0865 | 0.4 |
| −59.1723 | −18.6601 | 0.4 |
| −58.9292 | −20.4944 | 0.4 |
| −58.3196 | −22.5352 | 0.4 |
| −57.2683 | −24.7024 | 0.4 |
| −55.7336 | −26.9041 | 0.4 |
| −53.7078 | −29.0514 | 0.4 |
| −51.2089 | −31.067 | 0.4 |
| −48.2734 | −32.8924 | 0.4 |
| −44.9489 | −34.4895 | 0.4 |
| −41.2866 | −35.8387 | 0.4 |
| −37.3365 | −36.9324 | 0.4 |
| −33.146 | −37.7726 | 0.4 |
| −28.7591 | −38.3682 | 0.4 |
| −24.2168 | −38.7332 | 0.4 |
| −19.557 | −38.8844 | 0.4 |
| −14.8149 | −38.8401 | 0.4 |
| −10.0236 | −38.6209 | 0.4 |
| −5.21395 | −38.2486 | 0.4 |
| −0.41512 | −37.746 | 0.4 |
| 4.345489 | −37.1359 | 0.4 |
| 9.041644 | −36.4385 | 0.4 |
| 13.64823 | −35.6727 | 0.4 |
| 18.14189 | −34.859 | 0.4 |
| 22.50055 | −34.0168 | 0.4 |
| 26.70317 | −33.1628 | 0.4 |
| 30.72967 | −32.3099 | 0.4 |
| 34.56199 | −31.4728 | 0.4 |
| 38.18357 | −30.6636 | 0.4 |
| 41.57941 | −29.8921 | 0.4 |
| 44.73628 | −29.1658 | 0.4 |
| 47.64333 | −28.4916 | 0.4 |
| 50.29196 | −27.8743 | 0.4 |
| 52.67616 | −27.3175 | 0.4 |
| 54.79269 | −26.8229 | 0.4 |
| 56.64139 | −26.3912 | 0.4 |
| 58.22524 | −26.0212 | 0.4 |
| 59.4554 | −25.4377 | 0.4 |
| 60.18516 | −24.6047 | 0.4 |
| 60.54537 | −23.8147 | 0.4 |
| 60.67636 | −23.1795 | 0.4 |
| 60.69517 | −22.7272 | 0.4 |
| 60.67531 | −22.4422 | 0.4 |
| 60.64494 | −22.225 | 0.4 |
| 60.60519 | −22.0331 | 0.4 |
| 60.53798 | −21.7868 | 0.4 |
| 60.39301 | −21.4093 | 0.4 |
| 60.10812 | −20.9048 | 0.4 |
| 59.59779 | −20.3206 | 0.4 |
| 58.77272 | −19.7746 | 0.4 |
| 57.58566 | −19.5092 | 0.4 |
| 56.13443 | −19.5831 | 0.4 |
| 54.44102 | −19.6774 | 0.4 |
| 52.50201 | −19.7816 | 0.4 |
| 50.31753 | −19.8935 | 0.4 |
| 47.89062 | −20.0091 | 0.4 |
| 45.22701 | −20.1236 | 0.4 |
| 42.33503 | −20.2312 | 0.4 |
| 39.22534 | −20.3253 | 0.4 |
| 35.91087 | −20.3974 | 0.4 |
| 32.40662 | −20.4374 | 0.4 |
| 28.72959 | −20.4365 | 0.4 |
| 24.89861 | −20.3855 | 0.4 |
| 20.93421 | −20.2733 | 0.4 |
| 16.85846 | −20.0901 | 0.4 |
| 12.69467 | −19.8291 | 0.4 |
| 8.467298 | −19.4834 | 0.4 |
| 4.201625 | −19.0478 | 0.4 |
| −0.07665 | −18.5203 | 0.4 |
| −4.3418 | −17.9021 | 0.4 |
| −8.56828 | −17.1963 | 0.4 |
| −12.7313 | −16.4093 | 0.4 |
| −16.807 | −15.5506 | 0.4 |
| −20.7732 | −14.6326 | 0.4 |
| −24.6095 | −13.6701 | 0.4 |
| −28.2975 | −12.681 | 0.4 |
| −31.8214 | −11.6859 | 0.4 |
| −35.1696 | −10.7128 | 0.4 |
| −38.3328 | −9.79 | 0.4 |
| −41.3065 | −8.95694 | 0.4 |
| −44.0901 | −8.26535 | 0.4 |
| −46.6817 | −7.7762 | 0.4 |
| −49.0706 | −7.57089 | 0.4 |
| −51.2181 | −7.70876 | 0.4 |
| −53.0554 | −8.20364 | 0.4 |
| −54.5243 | −8.96205 | 0.4 |
| −55.6317 | −9.82837 | 0.4 |
| −56.4362 | −10.6708 | 0.4 |
| −57.0068 | −11.4091 | 0.4 |
| −57.4023 | −12.0042 | 0.4 |
| −57.665 | −12.4446 | 0.4 |
| −58.0055 | −9.16141 | 0.5 |
| −58.1195 | −9.39048 | 0.5 |
| −58.2761 | −9.72777 | 0.5 |
| −58.4961 | −10.258 | 0.5 |
| −58.7569 | −11.014 | 0.5 |
| −59.0135 | −12.0265 | 0.5 |
| −59.1954 | −13.3176 | 0.5 |
| −59.2117 | −14.8913 | 0.5 |
| −58.958 | −16.7243 | 0.5 |
| −58.3367 | −18.7615 | 0.5 |
| −57.2729 | −20.9226 | 0.5 |
| −55.7255 | −23.1154 | 0.5 |
| −53.6874 | −25.251 | 0.5 |
| −51.1769 | −27.2522 | 0.5 |
| −48.231 | −29.0607 | 0.5 |
| −44.8973 | −30.6386 | 0.5 |
| −41.2273 | −31.9666 | 0.5 |
| −37.271 | −33.0376 | 0.5 |

TABLE 1-continued

| X | Y | Zadim |
|---|---|---|
| −33.0757 | −33.8536 | 0.5 |
| −28.6855 | −34.424 | 0.5 |
| −24.1412 | −34.7628 | 0.5 |
| −19.4805 | −34.8872 | 0.5 |
| −14.7388 | −34.8156 | 0.5 |
| −9.94879 | −34.5687 | 0.5 |
| −5.14137 | −34.1688 | 0.5 |
| −0.34552 | −33.6385 | 0.5 |
| 4.411495 | −33.001 | 0.5 |
| 9.103557 | −32.2766 | 0.5 |
| 13.70565 | −31.4842 | 0.5 |
| 18.19456 | −30.6447 | 0.5 |
| 22.54829 | −29.7774 | 0.5 |
| 26.74593 | −28.8992 | 0.5 |
| 30.76744 | −28.0232 | 0.5 |
| 34.59488 | −27.164 | 0.5 |
| 38.21174 | −26.3339 | 0.5 |
| 41.60308 | −25.5429 | 0.5 |
| 44.75571 | −24.7984 | 0.5 |
| 47.65882 | −24.1074 | 0.5 |
| 50.30386 | −23.4749 | 0.5 |
| 52.68482 | −22.9044 | 0.5 |
| 54.79847 | −22.3976 | 0.5 |
| 56.64464 | −21.9553 | 0.5 |
| 58.22634 | −21.5761 | 0.5 |
| 59.45311 | −20.9856 | 0.5 |
| 60.17807 | −20.1484 | 0.5 |
| 60.53373 | −19.3563 | 0.5 |
| 60.66105 | −18.7204 | 0.5 |
| 60.67726 | −18.268 | 0.5 |
| 60.65576 | −17.9831 | 0.5 |
| 60.62414 | −17.7661 | 0.5 |
| 60.58328 | −17.5744 | 0.5 |
| 60.51466 | −17.3286 | 0.5 |
| 60.3675 | −16.9518 | 0.5 |
| 60.07972 | −16.449 | 0.5 |
| 59.56603 | −15.8677 | 0.5 |
| 58.73783 | −15.3265 | 0.5 |
| 57.54926 | −15.0679 | 0.5 |
| 56.09848 | −15.1502 | 0.5 |
| 54.40564 | −15.2542 | 0.5 |
| 52.46726 | −15.3697 | 0.5 |
| 50.28346 | −15.4941 | 0.5 |
| 47.85726 | −15.6237 | 0.5 |
| 45.19436 | −15.7535 | 0.5 |
| 42.30304 | −15.8778 | 0.5 |
| 39.19395 | −15.9898 | 0.5 |
| 35.87995 | −16.081 | 0.5 |
| 32.37598 | −16.1411 | 0.5 |
| 28.69901 | −16.1615 | 0.5 |
| 24.86781 | −16.1325 | 0.5 |
| 20.90282 | −16.0431 | 0.5 |
| 16.82609 | −15.8834 | 0.5 |
| 12.66086 | −15.6464 | 0.5 |
| 8.431566 | −15.325 | 0.5 |
| 4.163455 | −14.914 | 0.5 |
| −0.11779 | −14.4112 | 0.5 |
| −4.38643 | −13.8175 | 0.5 |
| −8.6169 | −13.1361 | 0.5 |
| −12.7843 | −12.3731 | 0.5 |
| −16.865 | −11.5379 | 0.5 |
| −20.8364 | −10.6427 | 0.5 |
| −24.6782 | −9.70237 | 0.5 |
| −28.3718 | −8.73454 | 0.5 |
| −31.9013 | −7.75972 | 0.5 |
| −35.2551 | −6.80597 | 0.5 |
| −38.4236 | −5.90136 | 0.5 |
| −41.402 | −5.08545 | 0.5 |
| −44.1896 | −4.4099 | 0.5 |
| −46.7839 | −3.93569 | 0.5 |
| −49.174 | −3.74414 | 0.5 |
| −51.3207 | −3.89437 | 0.5 |
| −53.1551 | −4.39983 | 0.5 |
| −54.6195 | −5.16669 | 0.5 |
| −55.722 | −6.03937 | 0.5 |
| −56.5216 | −6.88645 | 0.5 |
| −57.088 | −7.62804 | 0.5 |
| −57.48 | −8.22535 | 0.5 |
| −57.7402 | −8.66727 | 0.5 |
| −58.1585 | −4.99126 | 0.6 |
| −58.2728 | −5.22021 | 0.6 |
| −58.4298 | −5.55733 | 0.6 |
| −58.6503 | −6.08732 | 0.6 |
| −58.9119 | −6.84304 | 0.6 |
| −59.1695 | −7.85526 | 0.6 |
| −59.3528 | −9.1462 | 0.6 |
| −59.3707 | −10.7199 | 0.6 |
| −59.119 | −12.5531 | 0.6 |
| −58.4998 | −14.591 | 0.6 |
| −57.4382 | −16.7532 | 0.6 |
| −55.8932 | −18.9476 | 0.6 |
| −53.8573 | −21.0854 | 0.6 |
| −51.3489 | −23.0892 | 0.6 |
| −48.4049 | −24.9007 | 0.6 |
| −45.0729 | −26.4822 | 0.6 |
| −41.4043 | −27.814 | 0.6 |
| −37.4491 | −28.8891 | 0.6 |
| −33.2546 | −29.7096 | 0.6 |
| −28.865 | −30.2845 | 0.6 |
| −24.3211 | −30.6281 | 0.6 |
| −19.6606 | −30.7574 | 0.6 |
| −14.9187 | −30.6907 | 0.6 |
| −10.1285 | −30.4489 | 0.6 |
| −5.32066 | −30.054 | 0.6 |
| −0.52425 | −29.5288 | 0.6 |
| 4.233432 | −28.8962 | 0.6 |
| 8.926249 | −28.1767 | 0.6 |
| 13.52917 | −27.3891 | 0.6 |
| 18.01895 | −26.5543 | 0.6 |
| 22.3736 | −25.6916 | 0.6 |
| 26.57215 | −24.8177 | 0.6 |
| 30.59458 | −23.946 | 0.6 |
| 34.42291 | −23.0908 | 0.6 |
| 38.04064 | −22.2645 | 0.6 |
| 41.43281 | −21.4771 | 0.6 |
| 44.58622 | −20.7359 | 0.6 |
| 47.49005 | −20.0479 | 0.6 |
| 50.13575 | −19.4182 | 0.6 |
| 52.5173 | −18.8501 | 0.6 |
| 54.63148 | −18.3456 | 0.6 |
| 56.47812 | −17.9052 | 0.6 |
| 58.06021 | −17.5277 | 0.6 |
| 59.2876 | −16.9384 | 0.6 |
| 60.01343 | −16.1021 | 0.6 |
| 60.36992 | −15.3103 | 0.6 |
| 60.49791 | −14.6746 | 0.6 |
| 60.51459 | −14.2221 | 0.6 |
| 60.49339 | −13.9372 | 0.6 |
| 60.462 | −13.7201 | 0.6 |
| 60.42134 | −13.5284 | 0.6 |
| 60.35297 | −13.2825 | 0.6 |
| 60.20621 | −12.9056 | 0.6 |
| 59.91896 | −12.4025 | 0.6 |
| 59.40588 | −11.8207 | 0.6 |
| 58.57825 | −11.2786 | 0.6 |
| 57.38995 | −11.0188 | 0.6 |
| 55.93908 | −11.0995 | 0.6 |
| 54.24613 | −11.2018 | 0.6 |
| 52.30764 | −11.3152 | 0.6 |
| 50.12371 | −11.4373 | 0.6 |
| 47.69737 | −11.5644 | 0.6 |
| 45.03433 | −11.6914 | 0.6 |
| 42.14288 | −11.8127 | 0.6 |
| 39.03368 | −11.9215 | 0.6 |
| 35.71959 | −12.0092 | 0.6 |
| 32.21556 | −12.0656 | 0.6 |
| 28.53857 | −12.0821 | 0.6 |
| 24.7074 | −12.0491 | 0.6 |
| 20.74251 | −11.9556 | 0.6 |
| 16.66594 | −11.7916 | 0.6 |
| 12.50097 | −11.5502 | 0.6 |
| 8.272009 | −11.2245 | 0.6 |
| 4.004331 | −10.8089 | 0.6 |
| −0.27638 | −10.3017 | 0.6 |
| −4.5444 | −9.70352 | 0.6 |
| −8.77416 | −9.01767 | 0.6 |

TABLE 1-continued

| X | Y | Zadim |
|---|---|---|
| −12.9408 | −8.25031 | 0.6 |
| −17.0205 | −7.41084 | 0.6 |
| −20.9911 | −6.51148 | 0.6 |
| −24.8318 | −5.56711 | 0.6 |
| −28.5244 | −4.59542 | 0.6 |
| −32.053 | −3.61691 | 0.6 |
| −35.4058 | −2.65965 | 0.6 |
| −38.5732 | −1.75172 | 0.6 |
| −41.5508 | −0.93269 | 0.6 |
| −44.3377 | −0.25422 | 0.6 |
| −46.9315 | 0.222706 | 0.6 |
| −49.3214 | 0.416763 | 0.6 |
| −51.4682 | 0.268773 | 0.6 |
| −53.3031 | −0.23476 | 0.6 |
| −54.7684 | −1.00009 | 0.6 |
| −55.8718 | −1.87162 | 0.6 |
| −56.6723 | −2.71786 | 0.6 |
| −57.2395 | −3.45886 | 0.6 |
| −57.6321 | −4.05576 | 0.6 |
| −57.8928 | −4.4974 | 0.6 |
| −58.3082 | 0.227378 | 0.7 |
| −58.4269 | 0.000643 | 0.7 |
| −58.5902 | −0.33343 | 0.7 |
| −58.8208 | −0.85913 | 0.7 |
| −59.0968 | −1.60973 | 0.7 |
| −59.3736 | −2.61687 | 0.7 |
| −59.5814 | −3.90409 | 0.7 |
| −59.6292 | −5.47719 | 0.7 |
| −59.4124 | −7.31484 | 0.7 |
| −58.8321 | −9.36411 | 0.7 |
| −57.8118 | −11.5461 | 0.7 |
| −56.3088 | −13.7696 | 0.7 |
| −54.314 | −15.9457 | 0.7 |
| −51.8442 | −17.9968 | 0.7 |
| −48.9351 | −19.864 | 0.7 |
| −45.6338 | −21.5086 | 0.7 |
| −41.9912 | −22.91 | 0.7 |
| −38.0572 | −24.0601 | 0.7 |
| −33.8791 | −24.9602 | 0.7 |
| −29.5012 | −25.6186 | 0.7 |
| −24.9646 | −26.0485 | 0.7 |
| −20.3074 | −26.2664 | 0.7 |
| −15.5652 | −26.29 | 0.7 |
| −10.7712 | −26.1393 | 0.7 |
| −5.95671 | −25.8359 | 0.7 |
| −1.15118 | −25.4021 | 0.7 |
| 3.617671 | −24.8601 | 0.7 |
| 8.323325 | −24.23 | 0.7 |
| 12.9404 | −23.5302 | 0.7 |
| 17.44525 | −22.7809 | 0.7 |
| 21.81551 | −22.0012 | 0.7 |
| 26.02992 | −21.2073 | 0.7 |
| 30.06821 | −20.4122 | 0.7 |
| 33.91212 | −19.63 | 0.7 |
| 37.54491 | −18.8728 | 0.7 |
| 40.95145 | −18.15 | 0.7 |
| 44.11839 | −17.4689 | 0.7 |
| 47.03478 | −16.8363 | 0.7 |
| 49.69198 | −16.257 | 0.7 |
| 52.0839 | −15.7344 | 0.7 |
| 54.2073 | −15.2702 | 0.7 |
| 56.06199 | −14.865 | 0.7 |
| 57.65098 | −14.5176 | 0.7 |
| 58.88935 | −13.9518 | 0.7 |
| 59.63096 | −13.1294 | 0.7 |
| 60.00244 | −12.3446 | 0.7 |
| 60.14251 | −11.7114 | 0.7 |
| 60.16779 | −11.2594 | 0.7 |
| 60.15201 | −10.9741 | 0.7 |
| 60.12475 | −10.7564 | 0.7 |
| 60.08775 | −10.564 | 0.7 |
| 60.02407 | −10.3168 | 0.7 |
| 59.88451 | −9.9372 | 0.7 |
| 59.60688 | −9.42869 | 0.7 |
| 59.10496 | −8.83723 | 0.7 |
| 58.28779 | −8.2795 | 0.7 |
| 57.10465 | −7.99713 | 0.7 |
| 55.65251 | −8.05024 | 0.7 |
| 53.95792 | −8.1203 | 0.7 |
| 52.01761 | −8.19683 | 0.7 |
| 49.83176 | −8.27736 | 0.7 |
| 47.40344 | −8.35827 | 0.7 |
| 44.73847 | −8.43459 | 0.7 |
| 41.84524 | −8.50084 | 0.7 |
| 38.73453 | −8.55047 | 0.7 |
| 35.41937 | −8.57509 | 0.7 |
| 31.9149 | −8.56489 | 0.7 |
| 28.23827 | −8.51143 | 0.7 |
| 24.40841 | −8.40558 | 0.7 |
| 20.44602 | −8.23666 | 0.7 |
| 16.37331 | −7.99512 | 0.7 |
| 12.21368 | −7.67457 | 0.7 |
| 7.991685 | −7.26839 | 0.7 |
| 3.732684 | −6.77178 | 0.7 |
| −0.53761 | −6.18315 | 0.7 |
| −4.79347 | −5.50393 | 0.7 |
| −9.00942 | −4.73774 | 0.7 |
| −13.1607 | −3.89126 | 0.7 |
| −17.2237 | −2.97433 | 0.7 |
| −21.1764 | −1.9996 | 0.7 |
| −24.9985 | −0.98234 | 0.7 |
| −28.672 | 0.059418 | 0.7 |
| −32.1813 | 1.104874 | 0.7 |
| −35.5152 | 2.125741 | 0.7 |
| −38.6649 | 3.093759 | 0.7 |
| −41.6264 | 3.96929 | 0.7 |
| −44.3998 | 4.700645 | 0.7 |
| −46.9841 | 5.226829 | 0.7 |
| −49.3698 | 5.466313 | 0.7 |
| −51.5191 | 5.35919 | 0.7 |
| −53.3633 | 4.890649 | 0.7 |
| −54.8429 | 4.153337 | 0.7 |
| −55.9626 | 3.302956 | 0.7 |
| −56.7791 | 2.472098 | 0.7 |
| −57.3602 | 1.742021 | 0.7 |
| −57.7642 | 1.152699 | 0.7 |
| −58.0331 | 0.716093 | 0.7 |
| −58.4228 | 3.615096 | 0.8 |
| −58.5386 | 3.386908 | 0.8 |
| −58.6979 | 3.050833 | 0.8 |
| −58.9219 | 2.522325 | 0.8 |
| −59.1885 | 1.768357 | 0.8 |
| −59.4528 | 0.757863 | 0.8 |
| −59.6447 | −0.53184 | 0.8 |
| −59.673 | −2.10541 | 0.8 |
| −59.4334 | −3.94022 | 0.8 |
| −58.8278 | −5.98214 | 0.8 |
| −57.7806 | −8.15135 | 0.8 |
| −56.2501 | −10.356 | 0.8 |
| −54.2285 | −12.5072 | 0.8 |
| −51.7334 | −14.5276 | 0.8 |
| −48.8014 | −16.3586 | 0.8 |
| −45.48 | −17.9621 | 0.8 |
| −41.8203 | −19.3183 | 0.8 |
| −37.8724 | −20.4196 | 0.8 |
| −33.6834 | −21.2678 | 0.8 |
| −29.2977 | −21.8719 | 0.8 |
| −24.7561 | −22.2456 | 0.8 |
| −20.0966 | −22.4058 | 0.8 |
| −15.3545 | −22.3706 | 0.8 |
| −10.5627 | −22.1605 | 0.8 |
| −5.75235 | −21.7975 | 0.8 |
| −0.95257 | −21.3041 | 0.8 |
| 3.809203 | −20.7031 | 0.8 |
| 8.506688 | −20.0148 | 0.8 |
| 13.11473 | −19.2577 | 0.8 |
| 17.60995 | −18.4527 | 0.8 |
| 21.97022 | −17.6189 | 0.8 |
| 26.17447 | −16.7729 | 0.8 |
| 30.2026 | −15.9278 | 0.8 |
| 34.03652 | −15.098 | 0.8 |
| 37.65965 | −14.2958 | 0.8 |
| 41.05696 | −13.5309 | 0.8 |
| 44.21523 | −12.8106 | 0.8 |
| 47.12355 | −12.1419 | 0.8 |
| 49.77337 | −11.5298 | 0.8 |

TABLE 1-continued

| X | Y | Zadim |
|---|---|---|
| 52.15864 | −10.9775 | 0.8 |
| 54.27611 | −10.487 | 0.8 |
| 56.12564 | −10.0589 | 0.8 |
| 57.7102 | −9.69184 | 0.8 |
| 58.94147 | −9.11072 | 0.8 |
| 59.67283 | −8.27919 | 0.8 |
| 60.03455 | −7.48983 | 0.8 |
| 60.16677 | −6.85494 | 0.8 |
| 60.18644 | −6.40265 | 0.8 |
| 60.16713 | −6.11761 | 0.8 |
| 60.13718 | −5.9003 | 0.8 |
| 60.0978 | −5.70833 | 0.8 |
| 60.03106 | −5.46197 | 0.8 |
| 59.88681 | −5.08412 | 0.8 |
| 59.60289 | −4.57908 | 0.8 |
| 59.09368 | −3.99389 | 0.8 |
| 58.26966 | −3.44633 | 0.8 |
| 57.08311 | −3.17864 | 0.8 |
| 55.63174 | −3.24974 | 0.8 |
| 53.93816 | −3.34079 | 0.8 |
| 51.99894 | −3.44136 | 0.8 |
| 49.81426 | −3.54897 | 0.8 |
| 47.38713 | −3.65997 | 0.8 |
| 44.72331 | −3.7693 | 0.8 |
| 41.83112 | −3.8714 | 0.8 |
| 38.72126 | −3.95957 | 0.8 |
| 35.40666 | −4.02527 | 0.8 |
| 31.90234 | −4.05849 | 0.8 |
| 28.22532 | −4.05059 | 0.8 |
| 24.39445 | −3.99221 | 0.8 |
| 20.43027 | −3.87241 | 0.8 |
| 16.35488 | −3.68136 | 0.8 |
| 12.1916 | −3.41237 | 0.8 |
| 7.964892 | −3.05854 | 0.8 |
| 3.700064 | −2.61474 | 0.8 |
| −0.57719 | −2.07907 | 0.8 |
| −4.84114 | −1.45264 | 0.8 |
| −9.06626 | −0.73875 | 0.8 |
| −13.2277 | 0.056221 | 0.8 |
| −17.3018 | 0.92273 | 0.8 |
| −21.2663 | 1.848407 | 0.8 |
| −25.1007 | 2.818224 | 0.8 |
| −28.7867 | 3.814388 | 0.8 |
| −32.3087 | 4.816278 | 0.8 |
| −35.6551 | 5.795754 | 0.8 |
| −38.8165 | 6.724667 | 0.8 |
| −41.7886 | 7.563434 | 0.8 |
| −44.5709 | 8.260365 | 0.8 |
| −47.1615 | 8.754487 | 0.8 |
| −49.55 | 8.96439 | 0.8 |
| −51.6978 | 8.830641 | 0.8 |
| −53.536 | 8.339285 | 0.8 |
| −55.0064 | 7.583695 | 0.8 |
| −56.1155 | 6.719503 | 0.8 |
| −56.9216 | 5.878592 | 0.8 |
| −57.4936 | 5.14137 | 0.8 |
| −57.8902 | 4.547088 | 0.8 |
| −58.1538 | 4.107182 | 0.8 |
| −57.8307 | 11.92126 | 0.9 |
| −57.9626 | 11.70201 | 0.9 |
| −58.1456 | 11.37827 | 0.9 |
| −58.4071 | 10.86727 | 0.9 |
| −58.7274 | 10.13447 | 0.9 |
| −59.0638 | 9.145632 | 0.9 |
| −59.348 | 7.873097 | 0.9 |
| −59.4896 | 6.305652 | 0.9 |
| −59.3828 | 4.458349 | 0.9 |
| −58.9258 | 2.37811 | 0.9 |
| −58.0375 | 0.139118 | 0.9 |
| −56.6698 | −2.17004 | 0.9 |
| −54.8084 | −4.46124 | 0.9 |
| −52.4653 | −6.65611 | 0.9 |
| −49.6728 | −8.69352 | 0.9 |
| −46.4755 | −10.5321 | 0.9 |
| −42.923 | −12.1483 | 0.9 |
| −39.0646 | −13.531 | 0.9 |
| −34.9476 | −14.6788 | 0.9 |
| −30.6168 | −15.5971 | 0.9 |
| −26.1139 | −16.297 | 0.9 |
| −21.478 | −16.7923 | 0.9 |
| −16.7456 | −17.0987 | 0.9 |
| −11.9512 | −17.2343 | 0.9 |
| −7.12719 | −17.2187 | 0.9 |
| −2.30433 | −17.0722 | 0.9 |
| 2.488356 | −16.8157 | 0.9 |
| 7.223215 | −16.4675 | 0.9 |
| 11.87382 | −16.0443 | 0.9 |
| 16.41534 | −15.5651 | 0.9 |
| 20.82434 | −15.0475 | 0.9 |
| 25.0786 | −14.5065 | 0.9 |
| 29.15713 | −13.9537 | 0.9 |
| 33.04085 | −13.4022 | 0.9 |
| 36.71235 | −12.863 | 0.9 |
| 40.15593 | −12.3447 | 0.9 |
| 43.35786 | −11.8538 | 0.9 |
| 46.3068 | −11.3962 | 0.9 |
| 48.99382 | −10.9765 | 0.9 |
| 51.41267 | −10.5975 | 0.9 |
| 53.55997 | −10.2608 | 0.9 |
| 55.43553 | −9.96695 | 0.9 |
| 57.04241 | −9.71498 | 0.9 |
| 58.31233 | −9.22405 | 0.9 |
| 59.10168 | −8.44735 | 0.9 |
| 59.51932 | −7.68609 | 0.9 |
| 59.69691 | −7.06237 | 0.9 |
| 59.74911 | −6.61268 | 0.9 |
| 59.75038 | −6.32698 | 0.9 |
| 59.73615 | −6.10808 | 0.9 |
| 59.7107 | −5.91377 | 0.9 |
| 59.66188 | −5.66324 | 0.9 |
| 59.54521 | −5.27598 | 0.9 |
| 59.29841 | −4.75181 | 0.9 |
| 58.83266 | −4.13147 | 0.9 |
| 58.05022 | −3.52598 | 0.9 |
| 56.88603 | −3.17354 | 0.9 |
| 55.43331 | −3.13992 | 0.9 |
| 53.73756 | −3.10876 | 0.9 |
| 51.79615 | −3.06941 | 0.9 |
| 49.60938 | −3.0194 | 0.9 |
| 47.18056 | −2.95531 | 0.9 |
| 44.51579 | −2.87251 | 0.9 |
| 41.62375 | −2.76605 | 0.9 |
| 38.51562 | −2.63002 | 0.9 |
| 35.2049 | −2.45683 | 0.9 |
| 31.70728 | −2.23759 | 0.9 |
| 28.04038 | −1.96489 | 0.9 |
| 24.22366 | −1.63076 | 0.9 |
| 20.2784 | −1.22577 | 0.9 |
| 16.22735 | −0.74171 | 0.9 |
| 12.09426 | −0.17358 | 0.9 |
| 7.90401 | 0.483736 | 0.9 |
| 3.682219 | 1.233535 | 0.9 |
| −0.54535 | 2.07586 | 0.9 |
| −4.75312 | 3.007748 | 0.9 |
| −8.91585 | 4.024077 | 0.9 |
| −13.0092 | 5.116693 | 0.9 |
| −17.0104 | 6.274366 | 0.9 |
| −20.8979 | 7.48316 | 0.9 |
| −24.6525 | 8.72661 | 0.9 |
| −28.2572 | 9.985656 | 0.9 |
| −31.6979 | 11.2386 | 0.9 |
| −34.965 | 12.45653 | 0.9 |
| −38.0513 | 13.61072 | 0.9 |
| −40.9553 | 14.66136 | 0.9 |
| −43.6802 | 15.55686 | 0.9 |
| −46.2285 | 16.23627 | 0.9 |
| −48.5956 | 16.61765 | 0.9 |
| −50.7475 | 16.63893 | 0.9 |
| −52.6163 | 16.28124 | 0.9 |
| −54.1373 | 15.6335 | 0.9 |
| −55.3057 | 14.85143 | 0.9 |
| −56.1703 | 14.07076 | 0.9 |
| −56.794 | 13.37665 | 0.9 |
| −57.2324 | 12.81248 | 0.9 |
| −57.5269 | 12.3927 | 0.9 |
| −58.2498 | 13.69252 | 1 |

TABLE 1-continued

| X | Y | Zadim |
|---|---|---|
| −58.3728 | 13.46813 | 1 |
| −58.5426 | 13.13728 | 1 |
| −58.7833 | 12.61615 | 1 |
| −59.0738 | 11.87104 | 1 |
| −59.3701 | 10.86944 | 1 |
| −59.6027 | 9.586489 | 1 |
| −59.681 | 8.014611 | 1 |
| −59.4999 | 6.173114 | 1 |
| −58.9594 | 4.112986 | 1 |
| −57.9816 | 1.911616 | 1 |
| −56.5219 | −0.34054 | 1 |
| −54.5697 | −2.55485 | 1 |
| −52.14 | −4.6535 | 1 |
| −49.2677 | −6.5767 | 1 |
| −45.9988 | −8.28486 | 1 |
| −42.3841 | −9.75659 | 1 |
| −38.4731 | −10.9827 | 1 |
| −34.3132 | −11.9636 | 1 |
| −29.9489 | −12.7066 | 1 |
| −25.4215 | −13.2244 | 1 |
| −20.7694 | −13.5324 | 1 |
| −16.0285 | −13.6479 | 1 |
| −11.2325 | −13.5901 | 1 |
| −6.41302 | −13.38 | 1 |
| −1.59999 | −13.0393 | 1 |
| 3.178468 | −12.5899 | 1 |
| 7.895444 | −12.0511 | 1 |
| 12.52521 | −11.4408 | 1 |
| 17.04373 | −10.7789 | 1 |
| 21.42828 | −10.084 | 1 |
| 25.65728 | −9.37197 | 1 |
| 29.71021 | −8.65524 | 1 |
| 33.56855 | −7.94765 | 1 |
| 37.21533 | −7.26089 | 1 |
| 40.63523 | −6.60422 | 1 |
| 43.81477 | −5.98465 | 1 |
| 46.74287 | −5.40866 | 1 |
| 49.41079 | −4.88096 | 1 |
| 51.81239 | −4.40475 | 1 |
| 53.94438 | −3.98175 | 1 |
| 55.80656 | −3.61258 | 1 |
| 57.40199 | −3.29605 | 1 |
| 58.65109 | −2.75433 | 1 |
| 59.40849 | −1.94644 | 1 |
| 59.79511 | −1.16897 | 1 |
| 59.94741 | −0.5386 | 1 |
| 59.98145 | −0.08716 | 1 |
| 59.9712 | 0.198349 | 1 |
| 59.94816 | 0.416499 | 1 |
| 59.9149 | 0.60963 | 1 |
| 59.85602 | 0.857984 | 1 |
| 59.72383 | 1.240225 | 1 |
| 59.4561 | 1.754026 | 1 |
| 58.96574 | 2.355093 | 1 |
| 58.15953 | 2.928548 | 1 |
| 56.98207 | 3.233783 | 1 |
| 55.52918 | 3.208817 | 1 |
| 53.83355 | 3.171602 | 1 |
| 51.89213 | 3.132675 | 1 |
| 49.70512 | 3.0945 | 1 |
| 47.2757 | 3.060644 | 1 |
| 44.60975 | 3.035967 | 1 |
| 41.71577 | 3.025773 | 1 |
| 38.60469 | 3.03642 | 1 |
| 35.28967 | 3.076024 | 1 |
| 31.78606 | 3.154113 | 1 |
| 28.11115 | 3.278786 | 1 |
| 24.28406 | 3.458806 | 1 |
| 20.32568 | 3.704449 | 1 |
| 16.25842 | 4.024837 | 1 |
| 12.10578 | 4.425916 | 1 |
| 7.892447 | 4.913804 | 1 |
| 3.643865 | 5.49283 | 1 |
| −0.61422 | 6.164073 | 1 |
| −4.85613 | 6.925604 | 1 |
| −9.05644 | 7.773324 | 1 |
| −13.1906 | 8.700063 | 1 |
| −17.2351 | 9.695527 | 1 |

TABLE 1-continued

| X | Y | Zadim |
|---|---|---|
| −21.1681 | 10.74665 | 1 |
| −24.9698 | 11.83775 | 1 |
| −28.6224 | 12.95048 | 1 |
| −32.1108 | 14.06372 | 1 |
| −35.4243 | 15.14899 | 1 |
| −38.5546 | 16.17784 | 1 |
| −41.4986 | 17.11057 | 1 |
| −44.2574 | 17.89552 | 1 |
| −46.831 | 18.47167 | 1 |
| −49.2116 | 18.75732 | 1 |
| −51.3625 | 18.69185 | 1 |
| −53.2155 | 18.25912 | 1 |
| −54.709 | 17.55061 | 1 |
| −55.845 | 16.72208 | 1 |
| −56.6775 | 15.9072 | 1 |
| −57.2726 | 15.18852 | 1 |
| −57.6879 | 14.60713 | 1 |
| −57.9653 | 14.17582 | 1 |
| −58.61 | 16.52977 | 1.1 |
| −58.7281 | 16.30274 | 1.1 |
| −58.8906 | 15.96827 | 1.1 |
| −59.1199 | 15.44202 | 1.1 |
| −59.3941 | 14.69074 | 1.1 |
| −59.6684 | 13.68292 | 1.1 |
| −59.873 | 12.3952 | 1.1 |
| −59.917 | 10.82199 | 1.1 |
| −59.6957 | 8.984879 | 1.1 |
| −59.1104 | 6.937031 | 1.1 |
| −58.0849 | 4.757516 | 1.1 |
| −56.5764 | 2.537742 | 1.1 |
| −54.5763 | 0.36654 | 1.1 |
| −52.1014 | −1.6786 | 1.1 |
| −49.1878 | −3.53868 | 1.1 |
| −45.8825 | −5.17513 | 1.1 |
| −42.2365 | −6.56766 | 1.1 |
| −38.2997 | −7.70817 | 1.1 |
| −34.1194 | −8.59803 | 1.1 |
| −29.7399 | −9.2457 | 1.1 |
| −25.2023 | −9.66459 | 1.1 |
| −20.5446 | −9.87109 | 1.1 |
| −15.8023 | −9.88306 | 1.1 |
| −11.0087 | −9.72066 | 1.1 |
| −6.19496 | −9.40555 | 1.1 |
| −1.3905 | −8.95993 | 1.1 |
| 3.377007 | −8.40632 | 1.1 |
| 8.081107 | −7.76477 | 1.1 |
| 12.69646 | −7.0536 | 1.1 |
| 17.19946 | −6.29332 | 1.1 |
| 21.56781 | −5.50296 | 1.1 |
| 25.78027 | −4.69882 | 1.1 |
| 29.8166 | −3.89384 | 1.1 |
| 33.65859 | −3.10225 | 1.1 |
| 37.28952 | −2.3361 | 1.1 |
| 40.69427 | −1.60498 | 1.1 |
| 43.85954 | −0.91619 | 1.1 |
| 46.77438 | −0.27646 | 1.1 |
| 49.43016 | 0.309308 | 1.1 |
| 51.8208 | 0.837798 | 1.1 |
| 53.94305 | 1.307208 | 1.1 |
| 55.79674 | 1.71691 | 1.1 |
| 57.38488 | 2.068172 | 1.1 |
| 58.62187 | 2.637015 | 1.1 |
| 59.36147 | 3.461224 | 1.1 |
| 59.73103 | 4.246948 | 1.1 |
| 59.86954 | 4.880494 | 1.1 |
| 59.89372 | 5.332563 | 1.1 |
| 59.87725 | 5.617784 | 1.1 |
| 59.84946 | 5.835378 | 1.1 |
| 59.81199 | 6.027737 | 1.1 |
| 59.74771 | 6.274748 | 1.1 |
| 59.60722 | 6.654015 | 1.1 |
| 59.32834 | 7.161851 | 1.1 |
| 58.82498 | 7.75208 | 1.1 |
| 58.00645 | 8.307811 | 1.1 |
| 56.82262 | 8.587287 | 1.1 |
| 55.37061 | 8.530632 | 1.1 |
| 53.6762 | 8.456436 | 1.1 |
| 51.73609 | 8.375166 | 1.1 |

TABLE 1-continued

| X | Y | Zadim |
|---|---|---|
| 49.55044 | 8.289291 | 1.1 |
| 47.12233 | 8.202446 | 1.1 |
| 44.45755 | 8.119617 | 1.1 |
| 41.56449 | 8.046294 | 1.1 |
| 38.45391 | 7.98907 | 1.1 |
| 35.13882 | 7.956347 | 1.1 |
| 31.63434 | 7.957987 | 1.1 |
| 27.95758 | 8.002463 | 1.1 |
| 24.12748 | 8.098953 | 1.1 |
| 20.16468 | 8.258186 | 1.1 |
| 16.0914 | 8.489771 | 1.1 |
| 11.931 | 8.800164 | 1.1 |
| 7.708024 | 9.196022 | 1.1 |
| 3.447822 | 9.682229 | 1.1 |
| −0.82389 | 10.26042 | 1.1 |
| −5.0814 | 10.92924 | 1.1 |
| −9.29921 | 11.68513 | 1.1 |
| −13.4526 | 12.52146 | 1.1 |
| −17.5178 | 13.42846 | 1.1 |
| −21.4729 | 14.39353 | 1.1 |
| −25.2974 | 15.40144 | 1.1 |
| −28.9734 | 16.43422 | 1.1 |
| −32.4853 | 17.4711 | 1.1 |
| −35.8217 | 18.48382 | 1.1 |
| −38.9737 | 19.44414 | 1.1 |
| −41.9373 | 20.31243 | 1.1 |
| −44.7126 | 21.03701 | 1.1 |
| −47.2981 | 21.55688 | 1.1 |
| −49.6844 | 21.79053 | 1.1 |
| −51.8334 | 21.67815 | 1.1 |
| −53.6765 | 21.20511 | 1.1 |
| −55.1542 | 20.46418 | 1.1 |
| −56.2719 | 19.61107 | 1.1 |
| −57.0863 | 18.77822 | 1.1 |
| −57.6657 | 18.04672 | 1.1 |
| −58.0682 | 17.45642 | 1.1 |
| −58.3361 | 17.01915 | 1.1 |
| −58.4214 | 21.3768 | 1.2 |
| −58.5423 | 21.15127 | 1.2 |
| −58.709 | 20.81887 | 1.2 |
| −58.9449 | 20.29554 | 1.2 |
| −59.2284 | 19.54777 | 1.2 |
| −59.5154 | 18.54348 | 1.2 |
| −59.7362 | 17.25842 | 1.2 |
| −59.8 | 15.68589 | 1.2 |
| −59.6018 | 13.84615 | 1.2 |
| −59.0423 | 11.79111 | 1.2 |
| −58.0442 | 9.598875 | 1.2 |
| −56.5637 | 7.360321 | 1.2 |
| −54.5911 | 5.164158 | 1.2 |
| −52.1421 | 3.088079 | 1.2 |
| −49.2521 | 1.191533 | 1.2 |
| −45.9676 | −0.48632 | 1.2 |
| −42.3394 | −1.92456 | 1.2 |
| −38.4172 | −3.11444 | 1.2 |
| −34.2484 | −4.05677 | 1.2 |
| −29.8774 | −4.75942 | 1.2 |
| −25.3454 | −5.2353 | 1.2 |
| −20.6907 | −5.5003 | 1.2 |
| −15.9489 | −5.57187 | 1.2 |
| −11.1536 | −5.46972 | 1.2 |
| −6.33635 | −5.21512 | 1.2 |
| −1.52667 | −4.82991 | 1.2 |
| 3.247424 | −4.33625 | 1.2 |
| 7.959214 | −3.75387 | 1.2 |
| 12.58314 | −3.10075 | 1.2 |
| 17.09534 | −2.39711 | 1.2 |
| 21.47327 | −1.66171 | 1.2 |
| 25.69551 | −0.91056 | 1.2 |
| 29.74164 | −0.15637 | 1.2 |
| 33.59327 | 0.586883 | 1.2 |
| 37.23354 | 1.307339 | 1.2 |
| 40.64721 | 1.995617 | 1.2 |
| 43.82088 | 2.644576 | 1.2 |
| 46.74353 | 3.24763 | 1.2 |
| 49.40646 | 3.799981 | 1.2 |
| 51.80355 | 4.298388 | 1.2 |
| 53.93153 | 4.741092 | 1.2 |
| 55.79023 | 5.127469 | 1.2 |
| 57.38265 | 5.458747 | 1.2 |
| 58.62669 | 6.012 | 1.2 |
| 59.37659 | 6.826851 | 1.2 |
| 59.756 | 7.607868 | 1.2 |
| 59.90246 | 8.239623 | 1.2 |
| 59.93232 | 8.691353 | 1.2 |
| 59.91943 | 8.976758 | 1.2 |
| 59.89438 | 9.194685 | 1.2 |
| 59.85933 | 9.387501 | 1.2 |
| 59.79815 | 9.635298 | 1.2 |
| 59.66244 | 10.0163 | 1.2 |
| 59.38997 | 10.5276 | 1.2 |
| 58.89407 | 11.12411 | 1.2 |
| 58.08258 | 11.69008 | 1.2 |
| 56.90236 | 11.98441 | 1.2 |
| 55.44976 | 11.94601 | 1.2 |
| 53.75455 | 11.89311 | 1.2 |
| 51.81356 | 11.83622 | 1.2 |
| 49.62701 | 11.77782 | 1.2 |
| 47.198 | 11.7215 | 1.2 |
| 44.53239 | 11.67216 | 1.2 |
| 41.63864 | 11.6352 | 1.2 |
| 38.52758 | 11.61706 | 1.2 |
| 35.21234 | 11.626 | 1.2 |
| 31.70816 | 11.67168 | 1.2 |
| 28.03225 | 11.76235 | 1.2 |
| 24.20366 | 11.90697 | 1.2 |
| 20.24318 | 12.11598 | 1.2 |
| 16.17313 | 12.39873 | 1.2 |
| 12.01696 | 12.76138 | 1.2 |
| 7.79929 | 13.21028 | 1.2 |
| 3.545534 | 13.74998 | 1.2 |
| −0.71858 | 14.3818 | 1.2 |
| −4.96735 | 15.10407 | 1.2 |
| −9.17533 | 15.91289 | 1.2 |
| −13.3178 | 16.80135 | 1.2 |
| −17.3714 | 17.75936 | 1.2 |
| −21.314 | 18.77406 | 1.2 |
| −25.1256 | 19.82995 | 1.2 |
| −28.7883 | 20.90884 | 1.2 |
| −32.2868 | 21.98977 | 1.2 |
| −35.6103 | 23.04434 | 1.2 |
| −38.75 | 24.04419 | 1.2 |
| −41.7025 | 24.94965 | 1.2 |
| −44.4684 | 25.70905 | 1.2 |
| −47.0472 | 26.26136 | 1.2 |
| −49.4304 | 26.52498 | 1.2 |
| −51.5806 | 26.43962 | 1.2 |
| −53.4294 | 25.98977 | 1.2 |
| −54.9164 | 25.26748 | 1.2 |
| −56.0447 | 24.42847 | 1.2 |
| −56.8695 | 23.60592 | 1.2 |
| −57.458 | 22.88177 | 1.2 |
| −57.8679 | 22.29656 | 1.2 |
| −58.1413 | 21.8627 | 1.2 |
| −58.3095 | 21.57619 | 1.2 |

In the above table, the plane Zadim=0 corresponds to the reference plane P0 situated at the base of the profile. This plane P0 is the intersection of the stacking axis AE of the arm 16B with the axisymmetric surface 12A of the hub, i.e. it passes via the intersection between the axis AE and the surface 12A where it is assembled with the hub 12. The plane Zadim=1 corresponds to the reference plane P1 situated at the top of the profile. This plane P1 is the intersection between the axis AE and the axisymmetric surface 14A of the shroud 14, i.e. it passes via the intersection of the axis AE with the surface 14A where it is assembled with the shroud 14.

By convention, the stacking axis AE of the arm 16A is the axis that extends in the radial direction Z and is the axis on which the various X,Y sections of the arm are "stacked" when designing the arm.

As mentioned at the beginning of the present description, the aerodynamic profile of the disclosure is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile.

Also, the aerodynamic profile is positioned rotated within ±10°, particularly within ±5°, more particularly within ±3°, with respect to the stacking axis of the arm. In other words, the stagger angle may vary by ±10°, particularly by ±5°, more particularly by ±3°.

The coordinates of the above table are given starting from a value Zadim=0 in the reference plane P0. The coordinate Zadim is non-dimensional, i.e. for a point P, situated at a distance D from the plane P0 (where D is measured along the axis Z), the value of Zadim is D/H, where H represents the total height of the profile as measured between the planes P0 and P1. Naturally, in the table above, by multiplying the coordinate Zadim by the height H, it is possible to obtain the complete coordinates of the arm.

Preferably, the height H of the profile of the arm lies in the range 144 mm±10%. By way of example, the reference plane P0 is at a distance of about 391 mm±10% from the axis A of the turbine.

In the above table, the profile is characterized by fifteen section planes at constant Zadim coordinates, for which the coordinates X and Y are specified. These fifteen section planes include eleven section planes located between Zadim=0 and Zadim=1, and thus arranged in the fluid stream, these section planes being distributed on the arm's height from P0 to P1. The fifteen section planes also include four section planes which are substantially outside the fluid stream (two section planes with Zadim<0, and two section planes with Zadim>1), these four section planes being provided for ensuring geometric continuity of the stacking, close to the head and the foot, respectively. In each section plane at constant coordinate Zadim, the section of the profile is given by a continuous and smooth curve, interconnecting all of the points (X,Y). In each section plane, the profile is interpolated so as to generate a uniform profile.

The invention claimed is:

1. An arm of a structural casing of a turbine having a central hub and a shroud, the arm connecting the central hub and the shroud, the arm presenting an aerodynamic profile that, when cold and in a non-coated state, is substantially identical to a nominal profile determined by Cartesian coordinates X,Y,Zadim given in Table 1, in which the coordinate Zadim is a quotient D/H, where D is a distance of a point under consideration from a first reference X,Y plane situated at a base of the nominal profile, and H is a height of said nominal profile measured from said first reference plane that is an intersection of a stacking axis of the arm and an axisymmetric surface of the central hub, out to a second reference plane that is an intersection of said stacking axis with an axisymmetric surface of the shroud, the measurements D and H being taken radially relative to an axial direction of the turbine, while the coordinate X is measured in the axial direction of the turbine, wherein the coordinates X and Y are expressed in millimeters (mm), and wherein: (1) said aerodynamic profile is defined within an envelope of ±1 mm in a direction normal to a surface of the nominal profile, (2) the coordinates X,Y of said aerodynamic profile lie within a range of ±5% relative to the coordinates X,Y of the nominal profile, or (3) the aerodynamic profile is positioned within ±10° with respect to the stacking axis.

2. The arm as claimed in claim 1, wherein the aerodynamic profile is positioned within ±5° with respect to the stacking axis.

3. The arm as claimed in claim 1, wherein the aerodynamic profile is positioned within ±3° with respect to the stacking axis.

4. The arm as claimed in claim 1, wherein the arm is a main arm belonging to a series of arms connecting the central hub and the shroud, said series comprising at least one main arm and at least one secondary arm.

5. The arm as claimed in claim 1, wherein the structural casing is an exhaust casing of the turbine.

6. A turbine comprising a structural casing, said structural casing comprising a plurality of arms each presenting the aerodynamic profile as claimed in claim 1.

7. A turbine as claimed in claim 6, wherein the structural casing is an exhaust casing.

8. A turbine comprising a structural casing, said structural casing comprising a central hub and a shroud, and a series of arms connecting the central hub and the shroud, said series of arms comprising at least one main arm and at least one secondary arm, wherein the at least one main arm presents the aerodynamic profile as claimed in claim 1.

9. The turbine as claimed in claim 8, wherein the structural casing is an exhaust casing.

10. The turbine as claimed in claim 8, including between 1 and 3 main arms that present the aerodynamic profile.

11. The turbine as claimed in claim 8, including a single main arm that presents the aerodynamic profile.

12. The turbine as claimed in claim 8, wherein the series of arms comprises between 10 and 20 arms comprising between 1 and 3 main arms.

13. The turbine as claimed in claim 8, wherein the series of arms comprises 15 arms comprising 1 main arm and 14 secondary arms.

14. The turbine as claimed in claim 12, wherein all the main arms present the aerodynamic profile.

15. The turbine as claimed in claim 8, wherein the series of arms comprises between 10 and 20 arms comprising between 7 and 19 secondary arms.

\* \* \* \* \*